(12) United States Patent
Pirkle (10) Patent No.: US 6,192,619 B1
(45) Date of Patent: Feb. 27, 2001

(54) FISHERMAN'S RELEASE CLIP

(75) Inventor: Fred L. Pirkle, Abington, PA (US)

(73) Assignee: Texan Corporation, Warminster, PA (US)

(*) Notice: Under 35 U.S.C. 154(b), the term of this patent shall be extended for 0 days.

(21) Appl. No.: 09/437,964

(22) Filed: Nov. 10, 1999

(51) Int. Cl.$^7$ ................................................. A01K 91/08
(52) U.S. Cl. ........................................ 43/43.12; 43/43.13
(58) Field of Search .............................. 43/43.12, 43.13; 24/343, 346, 535, 569, 507, 564

(56) References Cited

U.S. PATENT DOCUMENTS

| | | | |
|---|---|---|---|
| 692,274 * | 2/1902 | Gumaer | 24/564 |
| 823,379 * | 6/1906 | Walsh | 24/343 |
| 2,838,866 | 6/1958 | Labin | 43/4 |
| 3,131,449 * | 5/1964 | Chiyoichi Iida | 24/343 |
| 3,135,034 | 6/1964 | Fauteux | 24/507 |
| 3,239,902 * | 3/1966 | Cohen | 24/507 |
| 3,349,453 * | 10/1967 | Chiyoichi Iida et al. | 24/507 |
| 3,832,796 * | 9/1974 | Cardwell et al. | 24/343 |
| 3,879,884 | 4/1975 | Tucker | 43/42.72 |
| 3,905,148 | 9/1975 | Naone et al. | 43/43.12 |
| 3,930,330 | 1/1976 | Black | 43/17 |
| 3,959,913 * | 6/1976 | Weber | 43/43.12 |
| 4,255,890 * | 3/1981 | Smith | 43/43.12 |
| 4,428,142 | 1/1984 | Shedd et al. | 43/43.12 |
| 4,453,336 * | 6/1984 | Lowden | 43/43.12 |
| 4,538,372 * | 9/1985 | Petigoretz | 43/43.12 |
| 4,574,516 | 3/1986 | Shedd et al. | 43/43.12 |
| 4,574,518 | 3/1986 | Shedd et al. | 43/43.12 |
| 4,611,423 | 9/1986 | Rupp | 43/43.12 |
| 4,696,124 * | 9/1987 | Wille | 43/43.12 |
| 4,813,172 * | 3/1989 | McCue | 43/43.12 |
| 4,835,824 * | 6/1989 | Durham et al. | 24/346 |
| 4,856,224 | 8/1989 | Fincher | 43/43.12 |
| 4,920,689 * | 5/1990 | Anderson | 43/43.13 |
| 5,107,616 | 4/1992 | Ryder | 43/43.12 |
| 5,170,581 | 12/1992 | Lyons | 43/43.12 |
| 5,414,911 * | 5/1995 | Adams | 24/507 |
| 5,454,184 | 10/1995 | Pirkle | 43/43.12 |
| 5,878,834 * | 3/1999 | Brainerd et al. | 24/573.5 |

FOREIGN PATENT DOCUMENTS

2573956 * 6/1986 (FR).

* cited by examiner

*Primary Examiner*—Darren W. Ark
(74) *Attorney, Agent, or Firm*—Howson & Howson (57) ABSTRACT

A fisherman's release clip comprises a unitary molded clip body consisting of two parts. One part is an eye in the form of a snap hook having a resilient gate allowing it to be readily engaged with a line or cable but configured to prevent unintentional disengagement. The other part is a pair of fingers that are connected by a molded living hinge, and extend in side by side relationship. An adjusting screw is used to vary the spacing between the fingers, and gripper sleeves are removably fitted onto the fingers to grip a line extending between the sleeves. The release clip can be used in a variety of modes including outrigger, downrigger, flat line and kite fishing, and also in fishing utilizing hydrofoils, downplanes, weights and floats.

14 Claims, 5 Drawing Sheets

FISHERMAN'S RELEASE CLIP

SUMMARY OF THE INVENTION

This invention relates to fishing, and particularly to an improved fisherman's release clip for holding a section of line, usually fishing line, and releasing the section of line when a predetermined tensile force is applied to the line.

In deep sea sportfishing, it is common for a single boat to put out multiple lines through the use of outrigger poles. Outrigger poles are long poles that extend from various positions on the boat and spread the fishing lines apart from one another. Each outrigger pole typically has an outrigger line fed over pulleys located at its inner and outer ends of the pole. Outrigger release clips are connected to the outrigger line at various locations spaced from one another. A fishing line may extend from a fishing rod, through a release clip on the outrigger line, to a bait or lure in the water. When a fish strikes the bait or lure, the tensile force causes the clip to release the line. Release of the line allows the bait to remain stationary in the water for a time so that the fish, after making an initial strike, is more likely to return and take the bait. Release of the line, of course, also allows the fisherman to reel in the fish. U.S. Pat. No. 3,905,148, dated Sep. 16, 1975, illustrates the use of a release clip in outrigger fishing.

Because the release clip releases the line to allow the bait to remain stationary in the water while trolling, a release clip is also known as a "drop back" clip. Release clips can be used in various modes of fishing, including simple trolling from a fishing rod.

Release clips are also used in downrigger fishing, to connect a fishing line releasably to a downrigger ball or hydrofoil (also known as a downplane), or to its cable, in order to maintain the bait or lure at a desired depth while trolling. U.S. Pat. No. 3,879,884, dated Apr. 29, 1975, illustrates the use of a release clip in downrigger fishing.

Similarly, in flat line fishing, a release clip may be attached to the fishing rod near the heel of the rod, or to a short tag line attached to the transom of the boat close to the water line. Flatline fishing reduces the tendency of a lure to splash along the surface of the water. Also, in the case of fishing with a weight to hold the lure or bait under water, it reduces or eliminates "bellying," i.e. the tendency, in trolling, for the pressure of the water against the fishing line to produce a "belly" in the line, resulting in a pulling of the lure or bait toward the surface of the water. In flatline fishing, the release clip maintains the length of fishing line between it and the bait or lure close to, or below, the water surface. This reduces or eliminates bellying, and allows the lure or bait to run deeper in the water.

There are various other known uses for release clips. For example, clips may be used in kite fishing. The clip is attached to a kite string which, when let out, carries the clip to a distance away from the boat. The fishing line passes through the clip to the lure or bait, which is then situated on or near the surface of the water. When a fish strikes, the clip releases the fishing line.

In trolling with a weighted lure, the effect of bellying can also be counteracted by a hydrofoil or a torpedo-shaped weight, used to pull the lure downward. The hydrofoil or weight is ordinarily connected to the line, and the bait or lure is then connected to the hydrofoil or weight through a leader, usually several meters long. The hydrofoil or weight causes difficulties in reeling in the fish when it is caught, because it cannot be drawn through the top eye of the fishing rod. Thus, when a long leader is used and the hydrofoil or weight reaches the end of the rod, it is necessary to grasp the leader manually in order to haul in the fish. The drag of the hydrofoil or weight in the water also makes it difficult to reel in the fish.

Similar difficulties are encountered in float fishing. The float will not pass through the top eye of a fishing rod, and consequently, in the case of a long leader, it is necessary to grasp the leader manually in order to haul in the fish. Also, when a fish takes the bait or lure, the drag of the float on the water makes it necessary for the fisherman is fighting the float as well as the fish. Release clips have not heretofore provided a satisfactory solution to the problems encountered in fishing with a hydrofoil, weight or float.

Numerous release clips have been devised, and examples are set forth in the following U.S. Pat. Nos.:

2,838,866 Nov. 22, 1955
3,879,884 Apr. 29, 1975
3,905,148 Sep. 16, 1975
3,930,330 Jan. 6, 1976
4,428,142 Jan. 31, 1984
4,574,516 Mar. 11, 1986
4,574,518 Mar. 11, 1986
4,611,423 Sep. 16, 1986
4,856,224 Aug. 15, 1989
5,107,616 Apr. 28, 1992
5,170,581 Dec. 15, 1992
5,454,184 Oct. 3, 1995

All of these release clips are relatively complex and expensive. Moreover, in each case it is necessary to tie a knot or to use a special fastener to connect the clip to an outrigger line, downrigger cable, etc.

An important object of this invention is to provide a fisherman's release clip giving satisfactory or superior performance but sufficiently inexpensive that the fisherman can easily afford to keep several clips on hand in case of accidental loss. Another object of the invention is to provide a versatile fisherman's release clip capable of use in many different applications, such as outrigger fishing and weight or hydrofoil fishing. Another object of the invention is to provide a simple and reliable fisherman's release clip that can be attached easily to an outrigger line, downrigger cable or the like. Another object is to provide for easy intentional detachment of the clip from a line or cable while avoiding unintentional detachment. Another object is to provide a simple fisherman's release clip having a very broad range of release tensions. Another object is to overcome the problems encountered in fishing with hydrofoils, weights and floats, which interfere with hauling in of fish when long leaders are used because they will not pass through the top eye of a fishing rod. Another object is to provide a release clip that is small in size and which exhibits only a very small drag in the water. Still another object of the invention is to provide a versatile release clip that can be easily and inexpensively manufactured.

The fisherman's release clip in accordance with the invention comprises a clip body including a pair of fingers extending in side-by-side, closely spaced, relationship to each other. The fisherman's release clip has gripping means on the fingers for frictionally gripping a fishing line extending between the fingers.

The spacing of the fingers is adjustable, preferably by a screw extending through one finger and threaded into the other finger. The gripping means are preferably a pair of gripper sleeves, one sleeve fitting onto each finger and the sleeves being in opposed, closely spaced, relationship to each other for frictionally gripping a fishing line extending between them. The gripper sleeves may be made removable, so that soft and firm gripper sleeves may be interchanged to extend the range of tension at which a fishing line will be released from between the clips. A clip body, and sets of gripper sleeves having different frictional properties, can be provided together as a kit.

Preferably, the clip body also includes a snap hook constituted by an eye comprising a hook element having a tip, and a gate. The gate has an outer surface facing toward the outside of the eye and an inner surface facing toward the interior of the eye, and is resiliently urged in a direction to expand the eye so that it normally engages a part of the tip of the hook element facing toward the interior of the eye. The snap hook permits a line to enter the eye by pressing against the gate, but prevents outwardly directed pressure exerted on the inner surface of the gate by a line inside the eye from effecting release of the line from the eye.

In a preferred embodiment, the gate has a part extending beyond the tip of the hook element into the interior of the eye, with the outer surface of the gate on said part of the gate being spaced from the hook element, thereby permitting the line to be removed from the eye by drawing the line between the tip of the hook and said part of the gate toward the outside of the eye. The gate preferably extends both inwardly toward the interior of the eye and toward the eye end of the clip body, so that tensile forces on a line normally encountered in the use of the clip will not cause the line to slip outwardly between the gate and the tip of the hook element.

Another important feature of the invention is the configuration in which the clip body is molded. The hook element and one of the fingers are connected by a living hinge to the gate and the other finger. When the hinge is in a relaxed condition, the fingers diverge from each other from the location of the hinge and the gate is separated from the hook element. When the fingers are brought into parallel relation to each other, a bending stress is exerted on the hinge and the gate is held in resilient contact with the hook element. Thus, the relaxed configuration makes it possible to mold the gate and hook without causing them to fuse together. The configuration of clip body also makes it possible for the action of the screw and hinge to impart a spring force urging the gate closed.

These various features, individually and in combination, provide a highly versatile, simple and reliable fisherman's release clip that is sufficiently inexpensive that a fisherman need not be excessively careful to avoid its accidental loss, and can easily afford to keep a supply of the clips on hand for replacement of lost clips.

Other objects, details and advantages of the invention will be apparent from the following detailed description when read in conjunction with the drawings.

DETAILED DESCRIPTION

Figure 1:
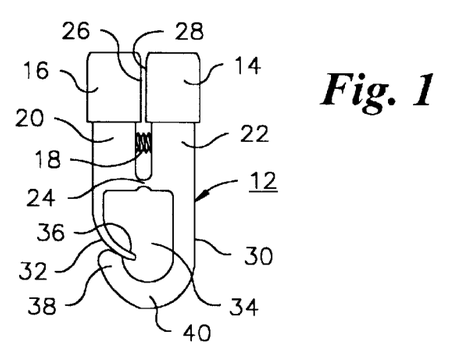
FIG. 1 is a front elevational view of a preferred embodiment of the fisherman's release clip in accordance with the invention.
Figure 2:
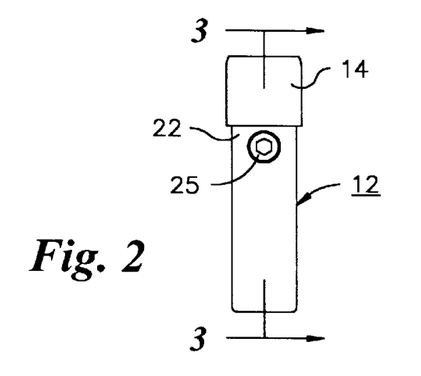
FIG. 2 is a side elevational view of the clip, as seen from the right-hand side of FIG. 1.
Figure 3:
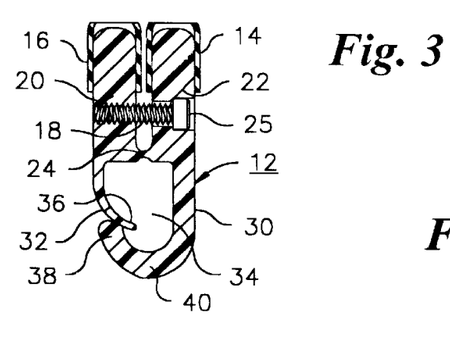
FIG. 3 is a vertical section taken on the plane 3—3 in FIG. 2.

In the embodiment illustrated in FIGS. 1–3, the fisherman's release clip comprises a body 12, a pair of gripper sleeves 14 and 16 and an adjusting screw 18.

The body is a unitary piece formed by injection molding from a suitable plastics material such as a super-tough polyamide, ABS, polyethylene, polypropylene or another plastics material that lends itself to a "living" hinge, that is, a hinge molded as a unit with the parts to which it is directly connected and which it connects together in articulating relationship. The clip body comprises a pair of fingers 20 and 22, extending in side-by-side, spaced relationship to each other and connected by narrow connecting element which serves as a living hinge 24, allowing the fingers 20 and 22 to be moved toward and away from each other. Screw 18 is threaded into finger 20 as shown in FIG. 3, and has an Allen head 25, shown in FIGS. 2 and 3, which is countersunk into a recess in finger 22. By rotation of the screw, with the aid of an Allen wrench, the user can adjust the spacing between the fingers. A 40-pitch screw is preferred for a fine adjustment of the finger spacing.

The gripper sleeves 14 and 16 are preferably formed from short lengths of extruded tubing of poly(vinyl chloride), polyurethane or silicone elastomer, and fit tightly over the fingers, as shown in FIG. 3, in opposed, closely spaced, relation to each other. The fingers are preferably rectangular in cross-section so that the gripper sleeves assume a rectangular configuration when placed on the fingers. Thus, the opposing faces 26 and 28 of the gripper sleeves are substantially flat and therefore capable of contacting a fishing line extending between them over a distance approximately equal to the width of a finger 22, as seen in FIG. 2.

Below the hinge, a snap hook is formed in the clip body. The snap hook comprises a hook element 30 and a gate 32 both of which are integral parts of the molded, unitary clip body. The hook element 30 and the gate 32 together form an eye surrounding an opening 34. The gate has a part 36 extending beyond the tip 38 of the hook element into the interior of the eye. The gate is resiliently urged in a direction to expand the eye and against the tip 38 of the hook element.

Figure 4:
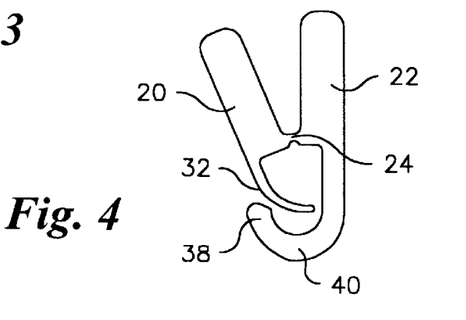
FIG. 4 is a front elevational view of the release clip as molded.

As shown in FIG. 4, the clip body is released from its mold with the hinge in a relaxed condition in which the fingers 20 and 22 are spread apart and diverge from each other from the location of the hinge. When the hinge is in the relaxed condition, gate 32 is also separated from the tip 38 of the hook element. When the screw 18 (FIGS. 1 and 3) pulls the fingers toward each other, a bending stress is imparted to the hinge, and the action of the hinge 24 causes the gate 32 to press resiliently against the tip 38 of hook element 40, so that the gate is held normally closed by a spring force. Thus, molding the clip body in this manner accomplishes two objectives. First, it prevents the gate and hook from being fused together in the molding process, in which case it would not be possible to form the snap hook by simple injection molding. Second, it makes it possible for the action of the screw and hinge to impart a spring force urging the gate closed.

A line can easily be slipped into the eye by causing it to press against the gate. This may be accomplished by holding the line taut and pressing it against the outwardly facing surface of the gate, or by holding the line taut and pressing the outwardly facing surface of the gate against the line. When the line is inside the eye, outward pressure exerted by the line on the inwardly facing surface of the gate will urge the gate against the tip of the hook element and will not result in release of the line from the eye.

The line may be released from the eye by slipping it between the tip 38 of the hook element and part 36 of the gate, which is spaced from the hook element and which preferably forms an acute angle with the adjacent inwardly facing surface of the hook element.

The tip of the hook is located at the side of the clip body rather than at the end 40, and the gate extends both inwardly toward the interior of the eye and toward the end 40 of the clip. As a result of the location of the tip of the hook element and the configuration of the gate, tensile forces on a line normally encountered in the use of the clip will not cause the line to slip outwardly between the gate and the tip of the hook element. However, a fisherman intending to release a line from the eye can easily do so by holding a portion of the line taut and moving it, relative to the clip, in a direction away from end 40 of the hook element and outward between the tip 38 of the hook and part 36 of the gate.

A line can, of course, be tied to the eye of the clip without inserting it between the gate and the tip of the hook. A large diameter tag line, for example, can be tied to the clip in this manner.

The spacing between the fingers, and consequently the pressure exerted by gripper faces 26 and 28 on a line located between them, can be adjusted by rotating screw 18. Thus the tension at which a line is released from between the grippers can be preset. The screw alone is capable of adjusting the release tension through a useful, but limited, range. The gripper sleeves, however, are removable and may be supplied in varying degrees of softness by the use of different materials or different formulations of a given material. The gripper sleeves may be color-coded according to their softness. A soft gripper sleeve will provide the clip with a first range of release tensions extending from a low value to an intermediate value. A firmer gripper sleeve will provide the clip with a second range of release tensions, overlapping the first range but extending from an intermediate value to a high value. The tension can be preset by tying an eye in a length of fishing line of the size to be used, inserting it between the gripper sleeves, and adjusting the release tension to the desired level, optionally with the aid of a scale. After the clip is adjusted to the desired release tension, the line can be slipped between the gripper sleeves without loosening the adjusting screw.

Various uses of the fisherman's release clip are illustrated in FIGS. 5–12.

Figure 5:
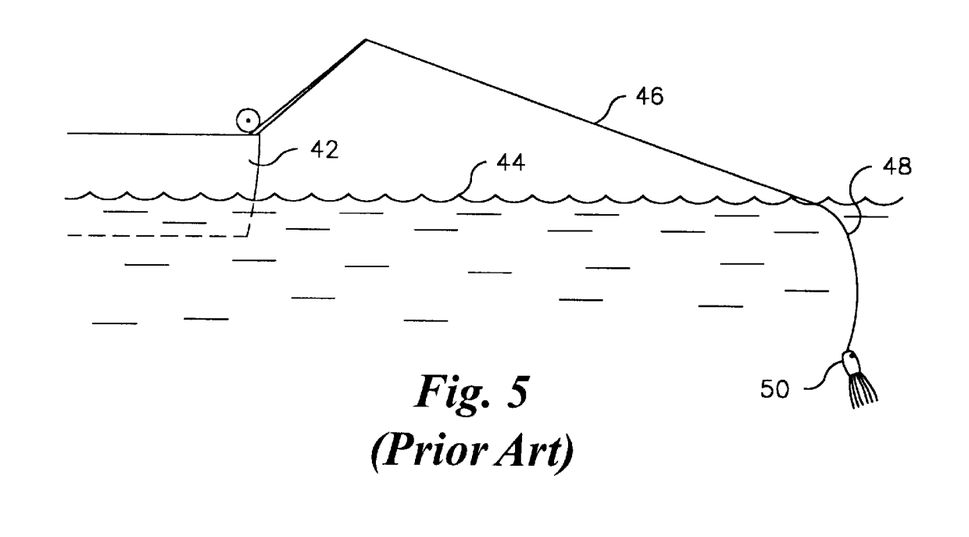
FIG. 5 is an elevational view illustrating conventional trolling without the aid of a clip.

As illustrated in FIG. 5, forward movement of a boat 42 through the water 44 causes the water to exert a rearward pressure on the portion of the line 46 that extends underneath the water. This phenomenon, known as "bellying, refers to the bend or "belly" 48 formed in the line. The result of bellying is that the lure 50, or bait, is drawn toward the surface of the water even though it may be desirable to maintain it at a considerable depth.

Figure 6:
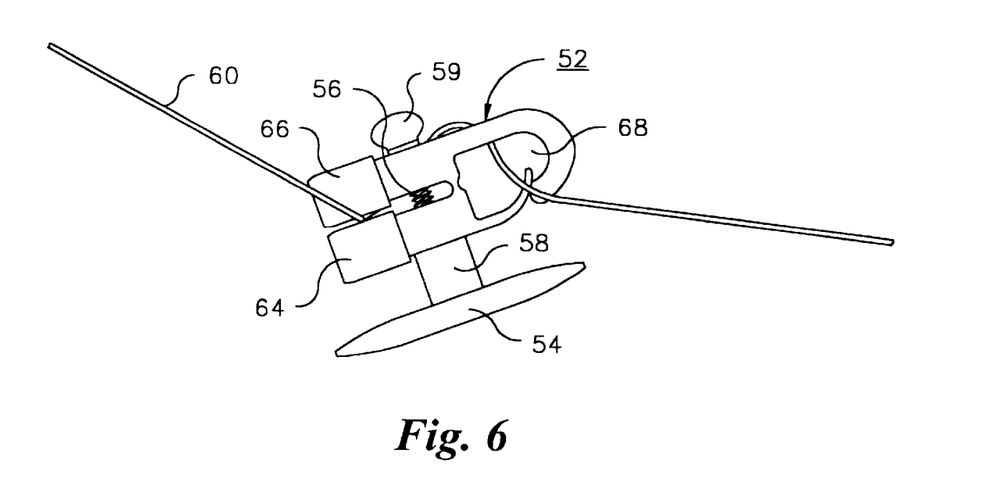
FIG. 6 is an elevational view illustrating a version of the clip in use with a downplaning hydrofoil.
Figure 7:
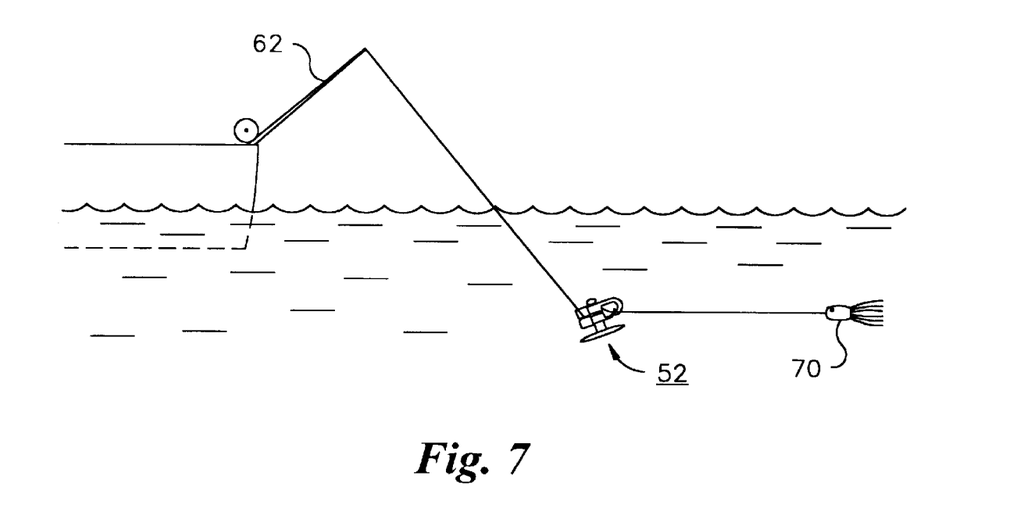
FIG. 7 is an elevational view further illustrating the clip in use with a downplaning hydrofoil.

A solution to the bellying problem depicted in FIG. 5 is to provide a clip of the kind shown in FIGS. 1–3 with a hydrofoil or downplane attached to it. In FIGS. 6 and 7, a clip 52 has a hydrofoil 54 attached to it. The hydrofoil can take various shapes and can be made from various materials. However, it is preferably a heavy, disc-shaped element made from metal, glass, or any of various commonly available plastics. The attachment can be accomplished easily by providing an extended adjusting screw 56 onto which a leg 58 of the hydrofoil can be threaded. Screw 56 is shown with an optional thumbscrew head 59 instead of an Allen head. The line 60 extends from the fishing rod 62 (FIG. 7), between the gripper sleeves 64 and 66 and thence through the loop 68 to the lure 70.

The hydrofoil keeps the clip at a desired depth, and the lure trailing behind the clip is also maintained at substantially the same depth. If a fish strikes the lure, the tension on the line will cause the line to be released from between the gripper sleeves, and the clip 52 will then slide toward the fish. Meanwhile, the clip and weight or hydrofoil holds the lure or bait at a desired depth determined by the amount of line between the tip of the rod and the clip.

Instead of a hydrofoil or downplane, the desired fishing depth can be maintained by means of a weight attached to the clip.

Figure 8:
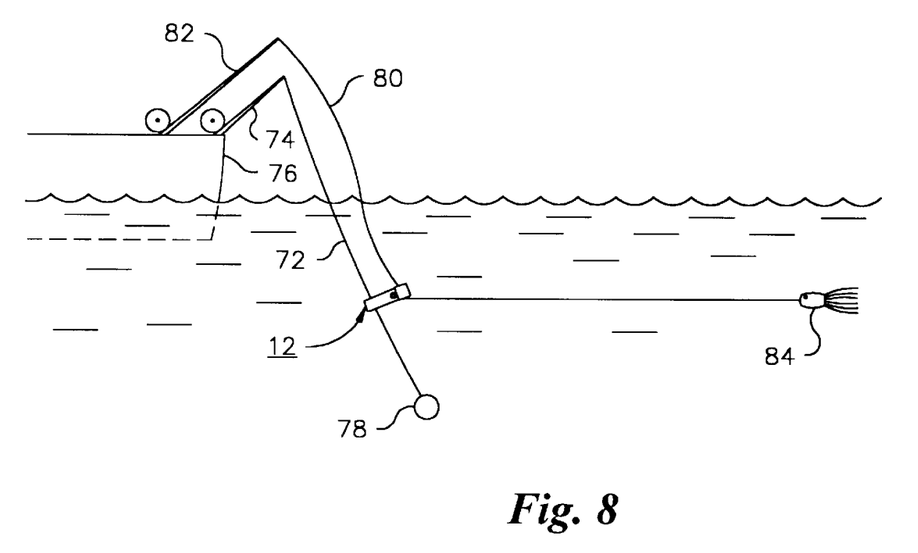
FIG. 8 is an elevational view illustrating the clip in use in fishing with a downrigger.

FIG. 8 shows clip 12 in use in downrigger fishing. A downrigger cable 72 extends from a downrigger boom 74 on the transom of a boat 76 to a weight 78, which is sufficiently heavy to maintain the cable at a steep angle despite the movement of the boat. The fishing line 80, connected to rod 82 extends between the gripper sleeves of clip 12 and thence to a lure 84. The eye of the clip slides on cable 72, and the movement of the boat maintains the clip at a depth, which is determined by the length of the section of fishing line between the rod and the clip. The lure trails behind the clip at substantially the same depth. When a fish strikes the lure with sufficient force, the tension on the fishing line, releases it from the clip, so that the fisherman can proceed to reel in the fish. In the meanwhile the clip will simply slide downward toward the weight for later retrieval when the weight is reeled in. Since the clip is inexpensive, there is no need to retrieve it immediately. Rather, the fisherman can simply set out another line on the downrigger cable using another clip.

Figure 9:
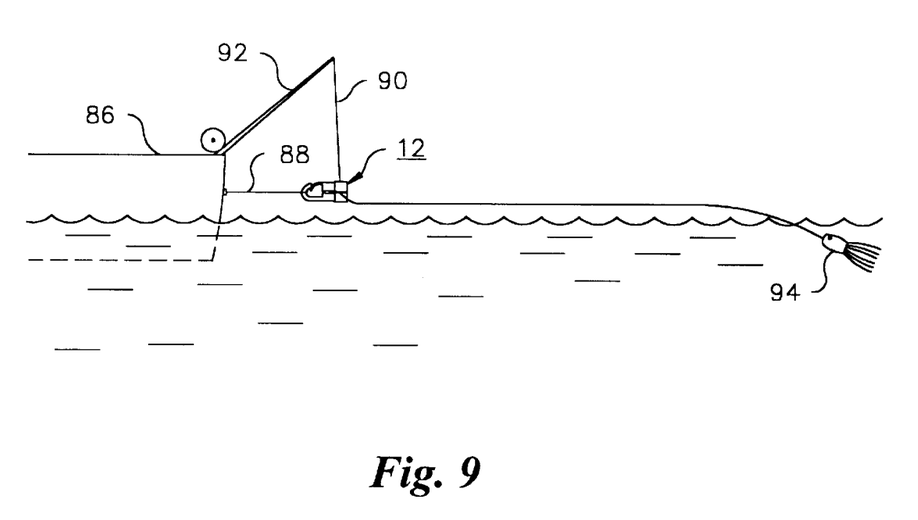
FIG. 9 is an elevational view illustrating the clip in use in flatline fishing.
Figure 12:
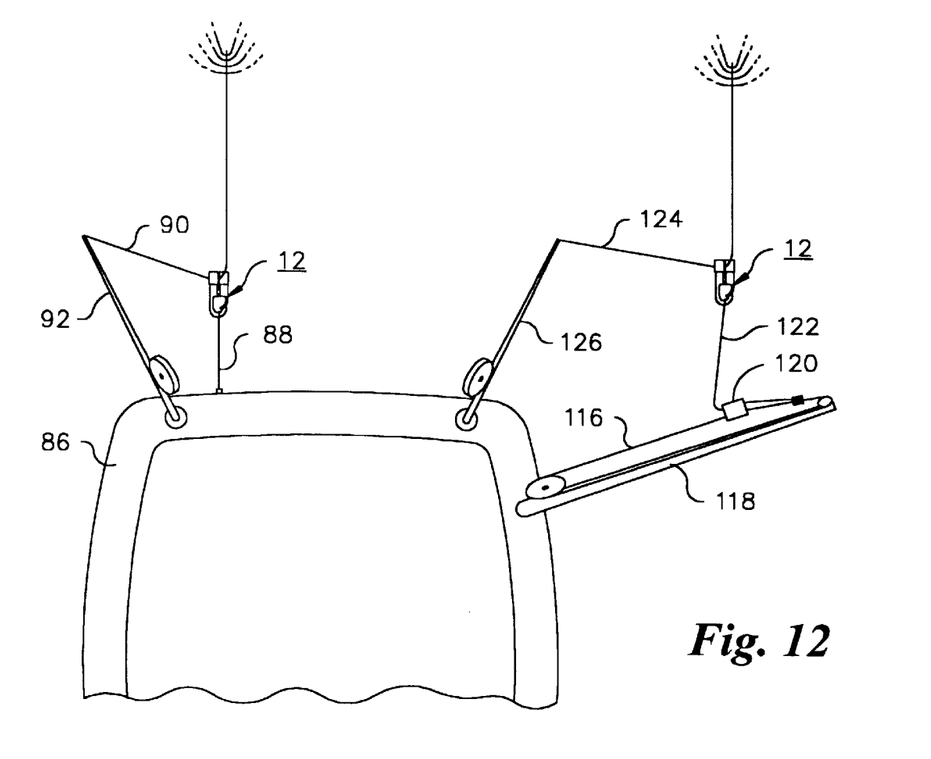
FIG. 12 is a plan view illustrating the clip in use with an outrigger.

In flatline fishing, as shown in FIG. 9 and also illustrated on the left-hand side of FIG. 12, the clip 12 is connected to the transom of a boat 86 by a tag line 88. The tag line may be tied to the eye of the clip, or provided with a loop for insertion into the eye between the gate and the tip of the hook element. Here, as in the case of downrigger fishing, the line 90 extends from the rod 92, and through the gripper sleeves of the clip to the lure 94. Alternatively, the clip can be connected through a tag line to the heel of the fishing rod 92, or even to an eye fixed to the transom of the boat under the waterline.

Figure 10:
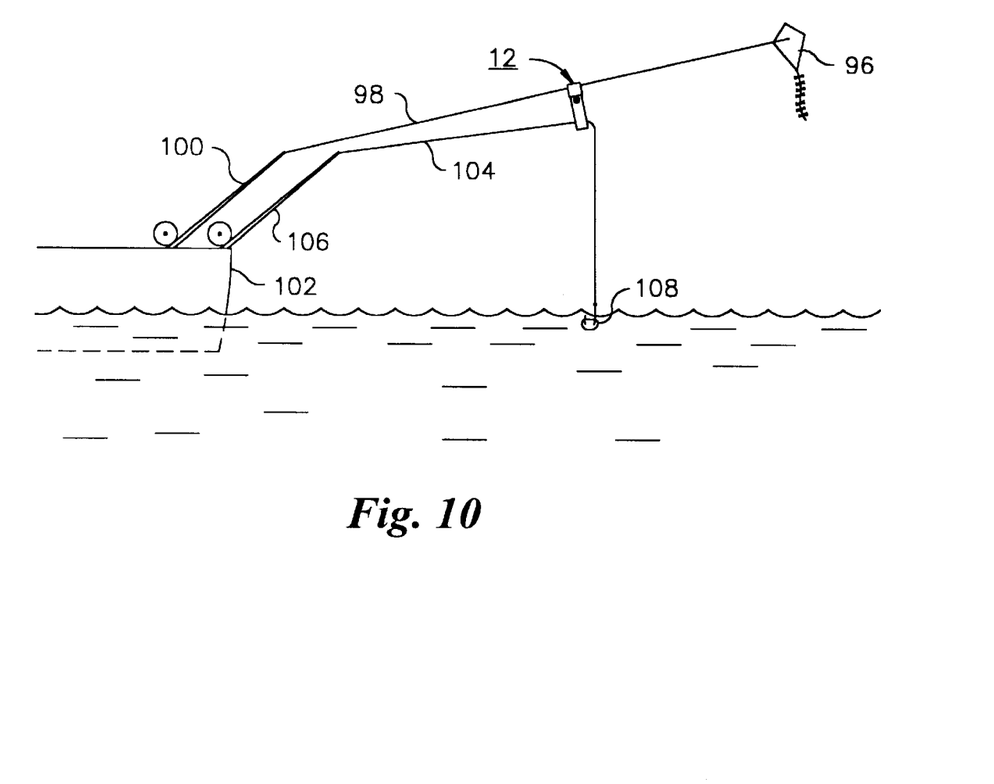
FIG. 10 is an elevational view illustrating the clip in use in kite fishing.

In kite fishing, as shown in FIG. 10, a kite 96 is flown on a kite string 98 extending from a boom 100 on boat 102. The fishing line 104 extends from rod 106 to a clip 12, and from the clip to the bait 108, or lure, which is typically at or just below the surface of the water. In this case, the fishing line extends through the eye of the clip, and the gripper sleeves of the clip grasp the kite string. The fishing line can be connected easily to the eye of the clip by drawing it between the gate and the tip of the hook element of the clip. When a fish strikes, the clip becomes disconnected from the kite string and falls into the water, being still on the fishing line 104 and retrievable when the fish is reeled in. In the meanwhile, the kite can be partially reeled in and a new fishing line set out by attachment of a new clip to the kite string.

As an alternative to the arrangement shown in FIG. 10, kite fishing can be carried out by tying the eye of the clip to the kite string and passing the fishing line between the gripper sleeves of the clip.

Figure 11:
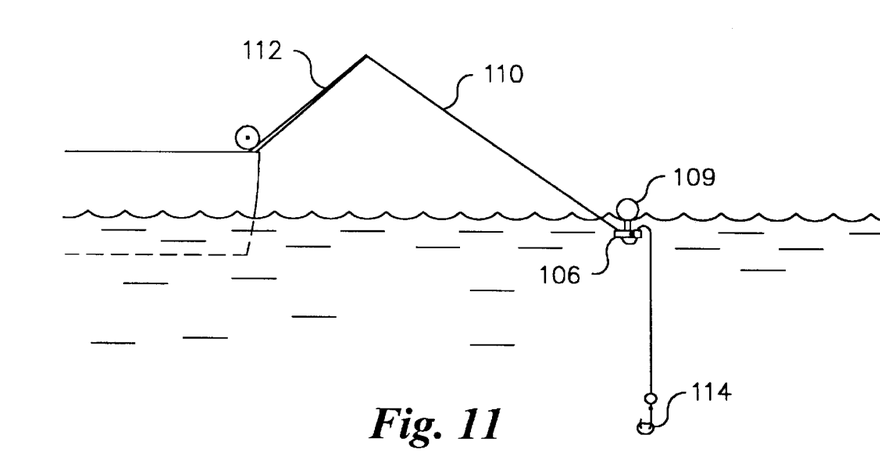
FIG. 11 is an elevational view illustrating the clip in use with a float.

In float fishing, as illustrated in FIG. 11, a clip 106 is attached directly to a float 109 which rides on the water surface. The fishing line 110 extends from a rod 112, through the eye of the clip and thence between the gripper sleeves, from which it extends to a lure 114, which is thereby maintained either near the surface, or at a desired depth by a weight. When a fish strikes the lure, the gripper sleeves release the line and allow the float and clip to slide toward the lure. Consequently, after the fish strikes, the fishing line extends directly from the rod to the float and clip, which are either in contact with, or very close to the fish. Thus, the fisherman need not expend effort dragging the float through the water, instead of directly fighting the fish.

In the case of outrigger fishing, as illustrated in FIG. 12, an outrigger line 116 extends between sheaves at the inner and outer ends of an upwardly and rearwardly extending outrigger pole 118. A clip 12 is attached to the outrigger line through a tag line 122. The tag line passes through a weight 120, which is slidable on the outrigger line 116. The tag line is either tied to the eye of the clip or, alternatively, has a loop (not shown) passing through the eye of the clip. The fishing line 124 extends from a rod 126, and between the gripper sleeves, to a lure (not shown) in the water. The drag of the lure in the water exerts a pulling force on the tag line, causing the weight 120 to slide up the outrigger line. Thus, the outrigger maintains the lure outboard of the backwash of the boat and may also be used to maintain separation between multiple fishing lines. As in the case of flatline and downrigger fishing, the tension exerted on the fishing line when a fish strikes the lure, will cause the clip to release the line, allowing the fisherman to fight and ultimately reel in the fish. When the line is released from the clip, the weight 120 is free to slide back down the outrigger line, automatically pulling the clip 12 back to an accessible location.

Figure 13:
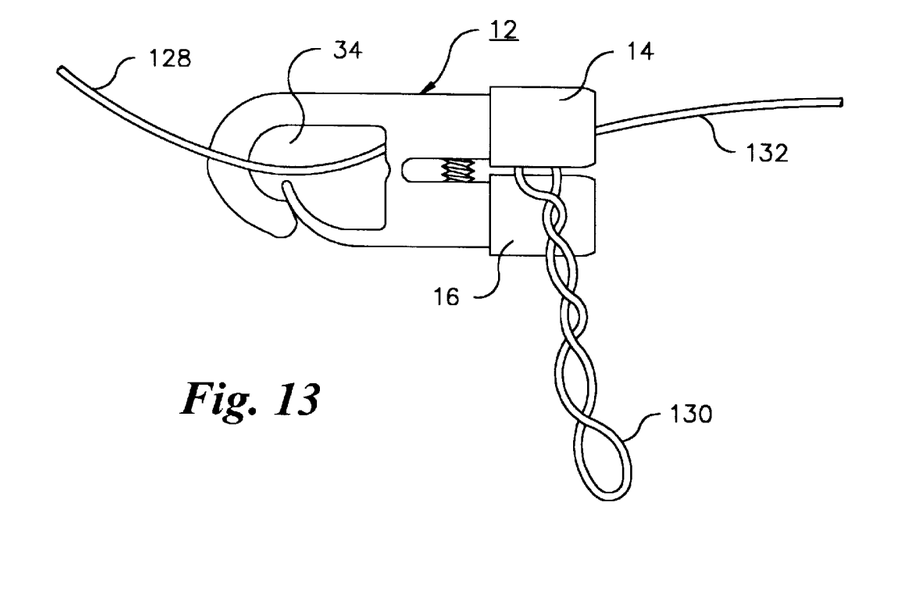
FIG. 13 is an elevational view illustrating the release clip used to hold a simple drop-back loop.

In FIG. 13, a line 128 is fed through eye 34 of a clip 12, and formed into a loop 130, two parts of which are held between gripper sleeves 14 and 16. The trailing portion 132 of the line extends from the clip to the bait or lure (not shown). The clip can be used in this manner as a simple drop-back clip.

As will be apparent from the above description, the clip has a high degree of versatility, being usable in various modes of fishing. It also exhibits numerous other advantages over prior release clips, including simplicity and low cost, ease of attachment to and detachment from a line, and a wide range of release tensions, especially by virtue of the replaceable gripper sleeves.

Modifications can be made to the release clip. For example, although the adjustment screw shown in FIGS. 1, 2 and 3 is preferred, it is possible, with a minor change in the configuration of the clip, and in the adjusting screw, to position the adjusting screw on the side of the hinge opposite from the fingers, and exert a pushing force, rather than a pulling force to force the fingers toward each other to increase the release tension. Various changes may also be made in the shape of the release clip.

These and still other modifications may be made to the device described above without departing from the scope of the invention as defined in the following claims.

I claim:

1. A fisherman's release clip comprising a clip body including a pair of fingers extending in side-by-side relationship to each other, the clip having gripping means on the fingers for frictionally gripping a line extending between the fingers, and the clip body being a unitary molded element and also including a snap hook, in which the clip body includes a living hinge, in which the snap hook comprises a hook element and a gate, the hook element and gate together forming an eye for receiving a line, the hook element having substantially parallel inside and outside surfaces, the inside surface facing the interior of the eye and the outside surface facing the exterior of the eye, in which the hook element and one of the fingers are connected by the living hinge to the gate and the other of said fingers, in which the thickness of the hook element, measured between said substantially parallel inside and outside surfaces, is substantially greater than the thickness of the living hinge, measured in a direction parallel to the direction in which said fingers extend when parallel to each other, whereby the hook element is substantially more rigid than the hinge, and in which, when the hinge is in a relaxed condition, the fingers diverge from each other from the location of the hinge and the gate is separated from the hook element, and in which, when the fingers are brought into parallel relation to each other, a bending stress is exerted on the hinge and the gate is held, by said bending stress, in resilient contact with the hook element whereby the gate is in a closed condition.

2. A fisherman's release clip according to claim 1, in which the gate has a part extending beyond the tip of the hook element into the interior of the eye, an outer surface of the gate on a part of the gate being spaced from the hook element when the date is closed, whereby the line can be removed from the eye by drawing the line between the tip of the hook element and said part of the gate toward the outside of the eye.

3. A fisherman's release clip according to claim 2, in which the fingers extend from an intermediate location on the clip body in a direction toward a first end of the clip body and the eye extends to a location adjacent to an opposite, second end of the clip body, in which the tip of the hook element is spaced in said first direction from said location, and said part of the gate extends both inwardly toward the interior of the eye and toward said opposite, second end of the clip body, whereby tensile forces on a line normally encountered in the use of the clip will not cause the line to slip outwardly between the gate and the tip of the hook element.

4. A fisherman's release clip according to claim 1, including means for adjusting the spacing between said fingers.

5. A fisherman's release clip comprising a clip body including a pair of fingers extending in side-by-side relationship to each other; a screw, connected to the fingers, for adjusting the spacing of the fingers from each other; and a pair of gripper sleeves, one of said sleeves fitting onto each finger and the sleeves being in opposed relationship to each other for frictionally gripping a line extending between the sleeves, in which the clip body includes an eye comprising a hook element having a hook tip and an inner surface adjacent to the hook tip, and a gate, the gate having a gate tip and opposite, substantially parallel, inner and outer surfaces meeting at the gate tip, the outer surface facing toward the outside of the eye and the inner surface facing toward the interior of the eye, and the gate being resiliently urged in a direction to expand the eye and normally being in a closed condition in which the outer surface of the gate engages a part of the hook tip facing toward the interior of the eye, whereby the hook element and gate together constitute a snap hook permitting a line to enter the eye by pressing against the gate, but preventing outwardly directed pressure exerted on the inner surface of the gate by a line inside the eye from effecting release of the line from the eye, and in which the gate extends beyond the hook tip into the interior of the eye, the gate tip and part of the outer surface of the gate adjacent to the tip being spaced from the hook element and extending from said part of the hook tip at an angle relative to the inner surface of the hook tip when the gate is closed, the hook element and said part of the outer surface of the gate together forming a tapered notch into which a line in the eye can be drawn, whereby the line can be removed from the eye by drawing the line between the tip of the hook and said part of the outer surface of the gate toward the outside of the eye.

6. A fisherman's release clip according to claim 5, in which the clip body is a unitary, molded element.

7. A fisherman's release clip according to claim 5, in which the fingers extend from an intermediate location on the clip body in a direction toward a first end of the clip body and the eye extends to a location adjacent to an opposite, second end of the clip body, in which the tip of the hook element is spaced in said first direction from said location, and said part of the gate extends both inwardly toward the interior of the eye and toward said opposite, second end of the clip body, whereby tensile forces on a line normally encountered in the use of the clip will not cause the line to slip outwardly between the gate and the tip of the hook element.

8. A fisherman's release clip comprising a clip body including a pair of fingers extending in side-by-side relationship to each other; a screw, connected to the fingers, for adjusting the spacing of the fingers from each other; a pair of gripper sleeves, one of said sleeves fitting onto each finger and the sleeves being in opposed relationship to each other for frictionally gripping a line extending between the sleeves; and a device from the group consisting of hydrofoils and floats fixed to the clip body, in which the clip body includes an eye comprising a hook element having a tip, and a gate, the gate having an outer surface facing towards the outside of the eye and an inner surface facing towards the interior of the eye, and the gate being resiliently urged in a direction to expand the eve and normally engaging a part of the tip of the hook element facing towards the interior of the eve, whereby the hook element and gate together constitute a snap hook permitting a line to enter the eye by pressing against the gate, but preventing outwardly directed pressure exerted on the inner surface of the gate by a line inside the eye from effecting release of the line from the eye.

9. A fisherman's release clip according to claim 8, in which said screw extends through one of said fingers and is threaded into the other of said fingers.

10. A fisherman's release clip according to claim 8, in which the clip body is a unitary molded element.

11. A fisherman's release clip according to claim 8, in which the clip body is a unitary molded element, and in which the clip body includes a narrow molded element forming a hinge connecting the fingers to each other.

12. A fisherman's release clip according to claim 8, in which the gripper sleeves are removable from the fingers of the clip body for replacement.

13. A fisherman's release clip kit comprising a clip body including a pair of fingers extending in side-by-side relationship to each other; and first and second pairs of gripper sleeves, the sleeves of the first pair being capable of fitting tightly onto the respective fingers and removable therefrom and the sleeves of the second pair also being capable of fitting tightly onto the respective fingers and removable therefrom, the sleeves of each pair, when fitted onto the fingers, being in opposed relationship to each other for frictionally gripping a line extending between the sleeves, and the sleeves of the first pair being softer than the sleeves of the second pair, whereby the tension at which a line is released by the clip can be adjusted by replacement of one pair of said sleeves on the fingers by the other pair of sleeves.

14. A fisherman's release clip kit according to claim 13, including a screw, extending through one of said fingers and threaded into the other of said fingers, for adjusting the spacing of the fingers from each other, whereby the tension at which a line is released by the clip can be adjusted through a broad range by adjustment of the spacing of the fingers and replacement of one pair of said sleeves on the fingers by the other pair of said sleeves.

* * * * *